(12) United States Patent
Klingler et al.

(10) Patent No.: US 6,589,585 B1
(45) Date of Patent: Jul. 8, 2003

(54) GLASS NOODLE CONTAINING GENETICALLY MODIFIED STARCH

(75) Inventors: Rudolf Klingler, Berlin (DE); Karl-Georg Busch, Berlin (DE)

(73) Assignee: Bayer CropScience GmbH, Frankfurt (DE)

( * ) Notice: Subject to any disclaimer, the term of this patent is extended or adjusted under 35 U.S.C. 154(b) by 0 days.

(21) Appl. No.: 09/526,660

(22) Filed: Mar. 15, 2000

(30) Foreign Application Priority Data

Mar. 17, 1999 (DE) .......................... 199 12 009

(51) Int. Cl.⁷ ................................. A23L 1/16
(52) U.S. Cl. ........................ 426/557; 426/451
(58) Field of Search ................. 426/557, 451

(56) References Cited

U.S. PATENT DOCUMENTS

| 4,871,572 A | | 10/1989 | Chiu et al. | |
| 5,773,069 A | * | 6/1998 | Lian et al. | ................. 426/557 |
| 5,916,616 A | * | 6/1999 | Kuwada et al. | ............ 426/557 |

FOREIGN PATENT DOCUMENTS

| DE | 195 09 695 | 9/1996 |
| DE | 19621588 A1 | 12/1997 |
| DE | 19636917 A1 | 3/1998 |
| WO | WO 97/11188 | 3/1997 |

OTHER PUBLICATIONS

Kasemsuwan et al, "Preparation of Clear Noodles with Mixtures of Tapioca and High Amylose Starches", Carbohydrate Polymers 32 (1998), pp. 301–312.

Kim et al, "Suitability of Edible Bean and Potato Starches for Starch Noodles", Cereal Chem 73(3), pp. 302–308, (1996).

* cited by examiner

*Primary Examiner*—Lien Tran
(74) *Attorney, Agent, or Firm*—Frommer Lawrence & Haug LLP

(57) ABSTRACT

A process for producing glass noodles using genetically modified starch, preferably from potatoes, glass noodles produced from genetically modified starch, preferably potato starch, and the use of genetically modified starch for producing glass noodles and demoldable gels.

5 Claims, 1 Drawing Sheet

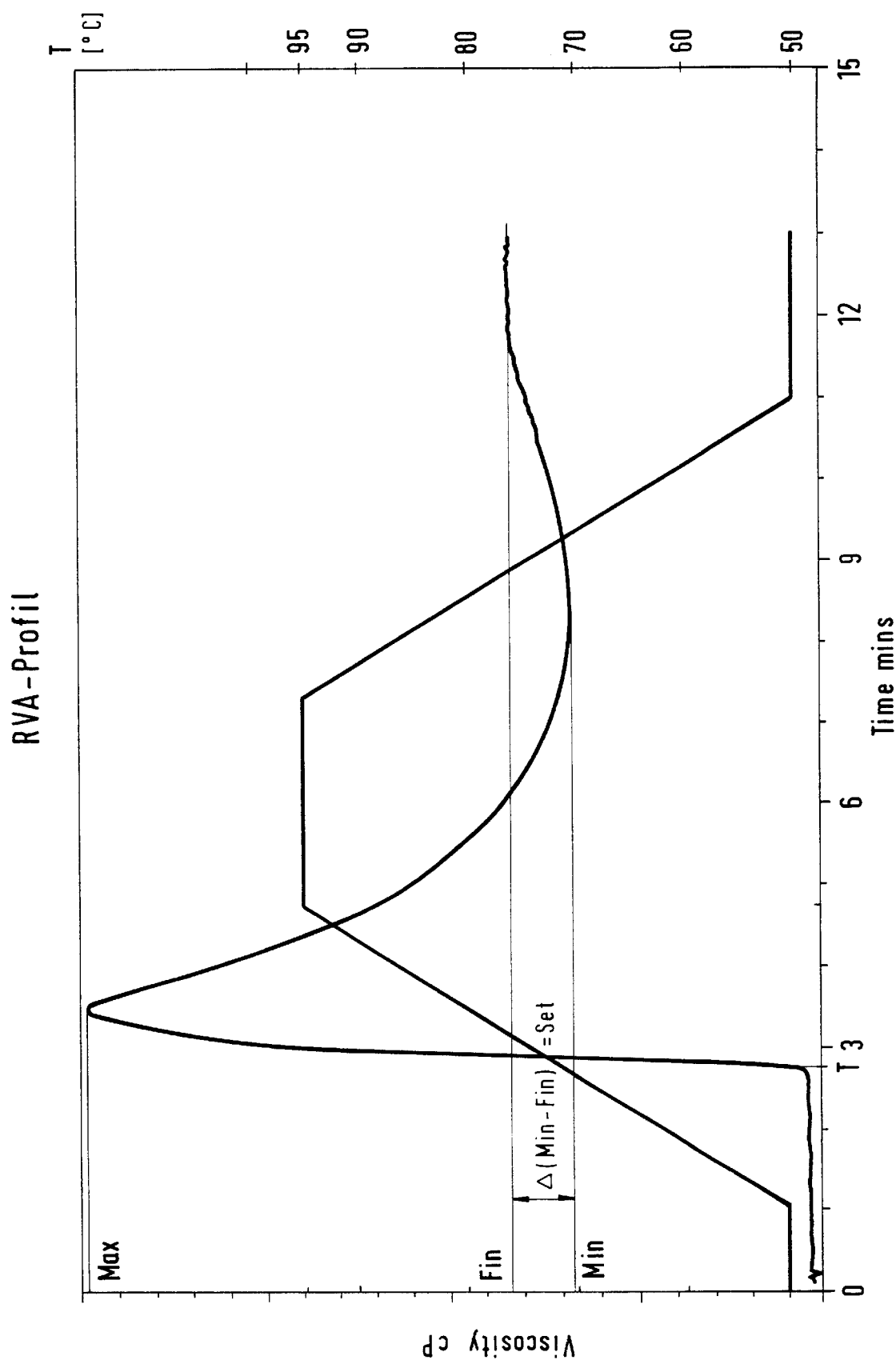

GLASS NOODLE CONTAINING GENETICALLY MODIFIED STARCH

The present invention relates to a process for producing glass noodles using genetically modified starch, a glass noodle which has been produced using genetically modified starch, and to the use of genetically modified starch for producing glass noodles and demoldable gels.

The essential features of the glass noodles of the invention are characterizable by physicochemical properties such as water absorption capacity, transparency, cooking loss and elasticity and thus define the appearance, cooking behavior and the texture (bite firmness, etc.) of the noodle.

To produce glass noodles, conventionally a paste is first prepared from mung bean starch and water, from which paste by further addition of starch a dough is prepared which can then be extruded, for example through fine nozzles into boiling water. After a short cooking time the noodles are cooled, resp., quenched and then dried.

The use of mung bean starch alone in the production of noodles leads to a very high quality glass noodle which, when dried, is white, appears transparent after boiling or cooking, has a low water absorption capacity and a high tensile strength and high elasticity. Since mung bean starch is produced in a highly complex production process, it is comparatively expensive. There have therefore been many attempts to replace mung bean starch in whole or in part by more inexpensive, occasionally chemically modified starches from wheat, potatoes, tapioca, sago, cassava, corn etc. (Kim et al., 1996, Cereal Chem. 73(3), 302–308, Kasemsuwan & Jane, 1995, AACC Annual Meetings, Abstract No. 185, Kasemsuwan et al. 1998, Carbohydrate Polymers 32, 301–312, Chang, 1983, Proceedings of the 6th Int. Congress of Food Sci. And Techn., 1, 111–112, Collado & Corke, 1997, Cereal Chem. 74(2), 182–187).

However, replacing the mung bean starch by more inexpensive starches in the doughmaking is accompanied by various disadvantages which primarily lead to a considerably reduced quality, i.e. reduced elasticity and a higher water absorption capacity (softer consistency) of the noodle.

The object of the present invention is therefore to provide an alternative production of glass noodles of high quality with good economic efficiency.

A further object of the invention is to provide an alternative to the limited availability of mung bean starch, especially for glass noodle production. In addition, the object of the invention is to provide an alternative for the use of optionally chemically modified starches of various origin in the production of glass noodles, in order to reduce production times and production costs.

These and other objects are achieved effectively by the present invention, as follows from the description below and the examples set forth.

Modern methods of gentechnology make available a multiplicity of transgenic, starch-producing plants, in particular corn, potato, wheat or rice, from which starch, that is to say within the meaning of the present invention "genetically modified starch" can be isolated, which starch sometimes has considerably modified physicochemical properties, for example a change in the amylose/amylopectin ratio, the chain length distribution of the amylopectin, the degree of phosphorylation and the mineral content ($Ca^{2+}$, $Mg^{2+}$, etc.) or the lipid content, etc.

Owing to the modified properties of said genetically modified starches some completely novel and also highly surprising possibilities for use are created given the extremely wide use of starches in industry and in the food sector.

It has now been found that, surprisingly, starches from genetically modified plants (GMS), preferably from tapioca, corn, wheat and/or potatoes, in particular, from wheat and/or potatoes and very particularly from potatoes, having an amylose content of greater than 25%, preferably >30, in particular >33% (amylose content determined by the method of Hovenkamp-Hermelink et al., 1988, Potato Research 31: 241–246) and a gel strength of about 90–160 g, preferably 100–160 g, in particular 110–160 g (gel strength determined in accordance with Example 3 B) are outstandingly suitable for producing glass noodles or demoldable gels.

The present invention therefore relates to a process for producing glass noodles in which starch, especially starch from tapioca, potatoes, corn and/or wheat, preferably potatoes and/or wheat, in particular potatoes, having an amylose content of at least 25%, preferably >30%, in particular >33% and a gel strength of about 90–160 g, preferably 100–160 g, in particular 110–160 g, is substituted and in processed in a conventional manner to give a glass noodle, in which preferably at least 30%, particularly preferably about 30–90%, in particular about 35–80%, and very particularly about 40–65% of the conventionally used mung bean starch is replaced by said starch.

In the process of the invention for glass noodles preference is furthermore given to starches from tapioca, potatoes, corn and/or wheat which have a phosphate content of at least 0.5 nmol, preferably 1 nmol and in particular 1.5 nmol of glucose-6-phosphate (G6P)/mg of starch (determined by the enzymatic method described in Example 8b of the international patent application WO 97/11188 A1).

The invention finally further relates to a glass noodle which features an elasticity of at least 1.5 g/cm, preferably at least 1.7 g/cm and/or a water absorption capacity of a maximum of 550%, preferably a maximum of 530%, in particular a maximum of 500%, at a diameter from about 0.4 to 0.45 mm of the dried noodle, obtainable by the process according to the invention for producing glass noodles, in which starch from tapioca, potatoes, corn and/or wheat, preferably potatoes and/or wheat, in particular potatoes, having an amylose content of at least 25%, preferably >30%, in particular >33%, and a gel strength of about 90–160 g, preferably 100–160 g, in particular 110–160 g, is processed in a conventional manner to give a glass noodle, in which preferably at least 30%, in particular about 30–90%, particular preferably about 35–80%, and very particular preferably about 40–45%, of the conventionally used mung bean starch is replaced by said starch and said starch in a further preferred embodiment has a phosphate content of at least 0.5 nmol, preferably 1 nmol, and in particular 1.5 nmol of G6P/mg of starch.

The invention also relates to the use of starch, especially a starch from tapioca, potatoes, corn and/or wheat, preferably potatoes and/or wheat, in particular potatoes, having an amylose content of at least 25%, preferably >30% in particular >33% and a gel strength of about 90–160 g, preferably 100–160 g, in particular 110–160, and a phosphate content of at least 0.5 nmol, preferably 1 nmol, and in particular 1.5 nmol of G6P/mg of starch in a process for producing glass noodles or demoldable gels.

Inasmuch as the use of said starches relates to the production of demoldable gels, for their production, preferably, an about 2–15% strength boiled suspension of said starch is cooled to a temperature of 0–30° C., preferably room temperature (i.e. about 15–25° C.). The present invention also relates to a process for producing demoldable gels in which starch, especially a starch from tapioca, potatoes, corn and/or wheat, preferably potatoes and/or wheat, in particular potatoes, having an amylose content of at least 25%, preferably >30% in particular >33% and gel strength of about 90–160 g, preferably 100–160 g, in particular 110–160 g, and a phosphate content of at least 0.5 nmol, preferably 1 nmol, and in particular 1.5 nmol of G6P/mg of starch, in an about 2–15% strength suspension, preferably 3–12% strength, in particular 4–10% strength suspension, is boiled and cooled to a temperature of about 0–30° C., preferably about 15–25° C.

The term "genetically modified starches" (GMSs) for the purposes of the present invention means starches from genetically modified plants, preferably from tapioca, corn, wheat and/or potatoes, in particular from wheat and/or potatoes, especially from potatoes, which have been modified by biotechnological methods, preferably with respect to their side-chain distribution (e.g., their amylose content), their phosphate content and/or their gel formation properties, which can be characterized, for example, by means of the ration of final viscosity to peak viscosity in an RVA profile (cf. Example 3 A) of their gel strength (cf. Example 3 B). GMSs are disclosed, for example, by the patent applications or patent hereinafter, the listing hereinafter not being complete:

WO 90/12876A1 (U.S. Pat. Nos. 6,147,277, 5,789,657, and 5,498,832), WO 91/19806A1, WO 92/11375A1 (U.S. Pat. No. 5,856,467), WO 92/11376A1 (U.S. Pat. No. 5,824,798), WO 92/11382A1 (U.S. Pat. No. 5,349,123), WO 92/14827A1 (U.S. Pat. No. 6,215,042), WO 94/09144A1, WO 94/11520A1, WO 95/04826A1 (U.S. Pat. Nos. 6,001,628, and 4,694,879), WO 95/07355A1 (U.S. Pat. No. 6,066,782), WO 95/26407A1 (U.S. Pat. No. 6,103,893), WO 95/34660A1 (U.S. Pat. No. 6,096,945), WO 95/35026A1 (U.S. Pat. Nos. 6,218,155, 5,824,790, and 5,576,048), WO 96/15248A1 (U.S. Pat. No. 6,130,367), WO 96/19581A1 (U.S. Pat. No. 6,117,665), WO 96/27674A1 (U.S. Pat. No. 6,162,966), WO 96/34968A1, WO 97/04112A1 (U.S. Pat. No. 6,147,279), WO 97/04113A1 (U.S. Pat. No. 6,232,122), WO 97/11188A1 (U.S. Pat. No. 6,207,880), WO 97/16554A1, WO 97/20040A1 (U.S. Pat. No. 6,169,226), WO 97/22703A1, WO 97/45545A1, WO 98/11181A1, WO 98/11228A1, WO 98/15621A1 (U.S. Pat. Nos. 6,143,963, and 4,865,451), WO 98/37213A1, WO 98/37214A1, CA 2,061,443, DE 19820607.0, P1 19820608.9, DE 19836097.5, DE 19836098.3, DE 19836099.1, EP-A-0521621 (U.S. Pat. Nos. 5,830,724, and 5,365,016), EP-A-0703314, EP-A-0737777, EP-A-0779363 or U.S. Pat. No. 5,300,145. WO 97/11188A1 extensively describes the GMSs used in the examples hereinafter; the contents of WO 97/11188A1 (and its U.S. equivalent, U.S. Pat. No. 6,207,880) are hereby explicitly incorporated by reference.

In the production of glass noodles, the use according to the invention of GMSs in the process of the invention allows at least 30% of the conventionally required mung bean starch to be replaced, preferably about 30–90%, particularly preferably about 35–80%, and in particular about 40–45% without any significant loss in quality of the glass noodles occurring.

Another preferred embodiment of the process of the invention additionally comprises the steps of a) preparing a paste using mung bean starch and b) preparing a noodle dough using said GMS.

For the purposes of the present invention, "glass noodle" means any noodle which has an elasticity (tensile strength/ elongation) of at least 1.5 g/cm, preferably at least 1.7 g/cm, and/or a water absorption capacity of a maximum of 550% (w/w), preferably a maximum of 530%, particularly preferably a maximum of 500%, determined at a noodle diameter of about 0.4–0.45 mm. However, the term "glass noodle" is not limited to a noodle of a diameter of about 0.4–0.45 mm, but applies to each noodle of the same composition.

For the purposes of the present invention, "elasticity" is defined as the tensile strength/elongation of the cooked noodle and is determined by tensile tests using a texture analyzer (Texture Analyser TA-XT2, Stable Micro Systems, UK). For this purpose, individual glass noodles (diameter 0.4–0.45 mm) after boiling (100 s at 100° C.) and cooling (60 s at 20° C.) were wound round an upper and lower round holder of the instrument, so that the intermediate space was 50 mm. The noodles were then extended at 1 mm/s up to break point and a stress-strain diagram was recorded. From the maximum required force to break a noodle and the elongation of the noodle at the time point of break, the ratio force/distance in g/cm was calculated as a measure of the elasticity.

The "cooking loss" was reported as dry residue of the cooking water based on the initial noodle dough mass, and the "transparency" was determined by optical evaluation.

"Water absorption capacity" for the purposes of the description is defined as the amount of water in g which was taken up by the noodle during the cooking process (100 s at 100° C.), based on the initial noodle dough mass.

DESCRIPTION OF THE FIGURES

FIG. 1: represents a diagrammatic RVA temperature profile (viscosity vs. time [min]) with the viscometric parameters T=gelatinization temperature, temperature at the time point when gelatinization begins; Max signifies the maximum viscosity (peak viscosity); Min designates the minimum viscosity; Fin designates the final viscosity; Set is the difference ($\Delta$) of Min and Fin (setback).

The examples hereinafter are intended to explain and illustrate the subject matter of the invention. The examples are therefore in no case to be understood as restricting the present invention.

EXAMPLES

Example 1

Glass Noodle Production

To prepare the noodle dough, initially a starch paste consisting of 49 parts of water and 6 parts of starch (control: mung bean starch) was produced at 20 90° C. for 15 min. Then, by successive addition of 55 parts of other starch, a dough was prepared and kneaded for 15 min at 40° C. to give a homogeneous composition. The homogeneous noodle dough was extruded into boiling water through fine nozzles of 1.5 mm in diameter and after a cooking time of 100 s the noodles were quenched for 60 s in cold water at 20° C.

After subsequent air drying, noodles having a diameter of 0.4 to 0.45 mm were obtained.

Example 2

Physicochemical Characterization of the Glass Noodles

Noodles which were produced according to Example 1 and had various starch compositions were analyzed for their various properties.

The mung bean starch (MB) was replaced by the starches listed hereinafter in such a manner that to prepare the paste, only mung bean starch was used and to prepare the dough differing amounts of alternative starches were used.

TABLE 1

Characterization of the glass noodles

| Ex. No. | Starch composition | Water absorption capacity (%) | Elasticity (g/cm) | Cooking loss (%) |
|---|---|---|---|---|
| 1 | MB (100%) | 432 | 2.15 | 6.1 |
| 2 | MB: PO (50:50) | 529 | 1.35 | 6.8 |
| 3 | MB: PO (25:75) | 576 | 0.99 | 6.8 |
| 4 | MB: GMS 1 (50:50) | 492 | 1.72 | 6.4 |
| 5 | MB: GMS 1 (25:75) | 529 | 1.56 | 6.8 |
| 6 | MB: GMS 2 (50:50) | 491 | 1.72 | 7.2 |
| 7 | MB: GMS 3 (50:50) | 498 | 1.52 | 5.5 |
| 8 | MB: GMS 4 (50:50) | 487 | 1.70 | 6.5 |
| 9 | MB: GMS 5 (50:50) | 531 | 1.65 | 5.8 |
| 10 | PAL (100) | 454 | 1.92 | 5.7 |
| 11 | PAL: GMS 1 (50:50) | 510 | 1.21 | 7.0 |

The abbreviations used in Table I have the following meanings:

| | |
|---|---|
| MB = | native mung bean starch, importer: Asia Mekong, Hamburg, FRG |
| PO = | conventional native potato starch, Emsland-Stärken, Emlichheim, FRG |
| GMS 1 = | genetically modified potato starch having an amylose content of about 37%, obtainable according to Example No. 10 of international patent application WO 97/11188A1 |
| GMS 2 = | genetically modified potato starch having an amylose content of about 33.8%, obtainable according to Example No. 10 of international patent application WO 97/11188A1 |
| GMS 3 = | genetically modified potato starch having an amylose content of about 27.5%, obtainable according to Example No. 6 of international patent application WO 97/11188A1 |
| GMS 4 = | genetically modified potato starch having an amylose content of about 31.7%, obtainable according to Example No. 6 of international patent application WO 97/11188A1 |
| GMS 5 = | genetically modified potato starch having an amylose content of about 31.9%, obtainable according to Example No. 7 of international patent application WO 97/11188A1 |
| PAL = | native green pea starch, manufacturer: Cosucra, Fonsenoy, Belgium |

Example 3
Characterization of the Starch Properties

3 A) Viscosity

The gelatinization properties or viscosity properties of starch samples can be recorded using a Rapid Visco Analyzer, Newport Scientific Pty Ltd, Investment Support Group, Warriewood NSW 2102, Australia.

For a Rapid Visco Analyzer (RVA) measurement, a suspension of 2 g of starch in 25 ml of water is subjected to the following heating program: suspend for 60 s at 50° C., heat from 50° C. to 95° C. at 12° C./min, hold at a constant temperature for 2.5 min, cool to 50° C. at 12° C./min and then keep constant for 2 min. The RVA temperature profile gives the viscometric parameters of the starches studied for the maximum (Max) and final viscosity (Fin), the gelatinization temperature (T), the minimum viscosity (Min) occurring after the maximum viscosity and the difference between minimum and final viscosity (Setback, Set) (cf. FIG. 1).

The quotient of final viscosity and peak viscosity of native potato starch from potatoes of the cultivar Desiree, which was determined in this manner, is about 0.4.

3 B) Gel Strength

To determine gel strength using a Texture Analyzer, 2 g of starch is gelatinized in 25 ml of water (cf. measurement using RVA) and then kept sealed air-tight for 24 h at 25° C. The samples were fixed under the probe (round piston) of a Texture Analyzer TA-XT2 (Stable Micro Systems) and the gel strength was determined using the following parameter settings:

| | |
|---|---|
| Test speed | 0.5 mm/s |
| Depth of penetration: | 7 mm |
| Contact surface (of the piston) | 113 mm$^2$ |
| Pressure/contact surface | 2 g |

What is claimed is:

1. A process for producing dried glass noodles, which comprises preparing a paste comprising starch from genetically modified plants, mung bean starch and water and wherein the amount of the starch from genetically modified plants is from 30 to 90% of the total amount of starch present in the paste; forming a dough from said paste; and then extruding said paste into boiling water to form the glass noodles, and drying the glass noodles, wherein the starch from the genetically modified plants has an amylose content of at least 25%, a gel strength of about 90 to 160 g, and a phosphate content of at least 0.5 nmol of glucose-6-phosphate/mg of the starch.

2. The process according to claim 1, wherein the amount of the starch from genetically modified plants is from 40 to 65% of the total amount of starch present in the paste.

3. A glass noodle which is obtainable by the process as claimed in claim 1.

4. A glass noodle which is obtainable by a process as claimed in claim 1, which has a diameter from about 0.4 to 0.45 mm after drying and exhibits an elasticity of at least 1.5 g/cm after cooking.

5. A glass noodle which is obtainable by a process as claimed in claim 1, which has a diameter from about 0.4 to 0.45 mm after drying and exhibits a water absorption capacity maximum of 550% after cooking.

* * * * *